Nov. 1, 1960     H. E. HOLLMANN     2,958,737
SIGNAL RECORDING SYSTEM
Filed July 9, 1956
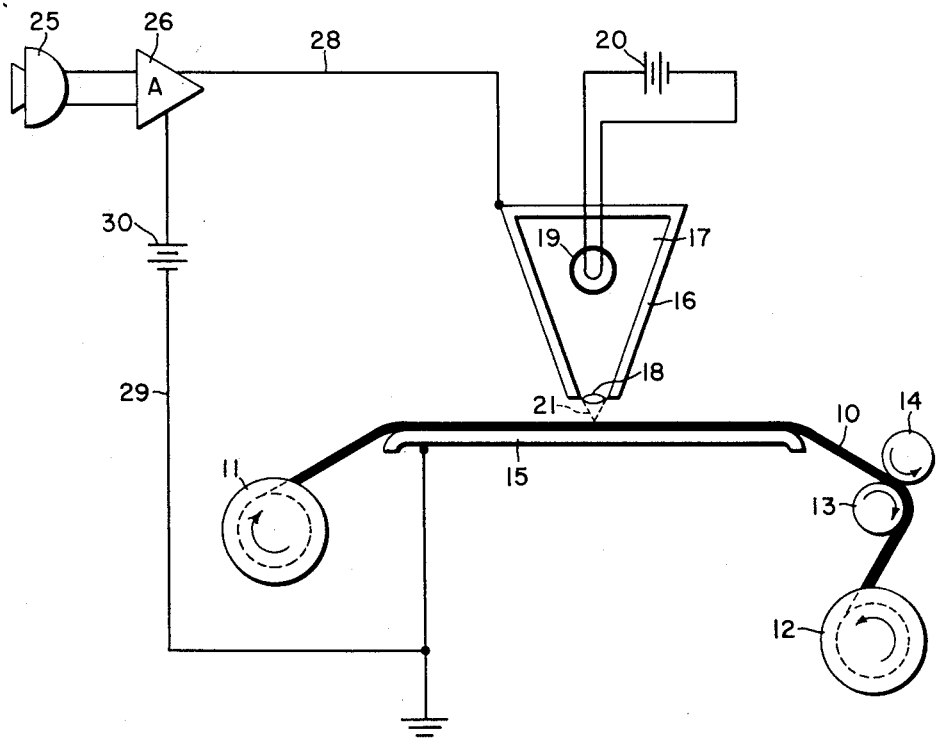
INVENTOR.
HANS E. HOLLMANN United States Patent Office 2,958,737
Patented Nov. 1, 1960

2,958,737

SIGNAL RECORDING SYSTEM

Hans E. Hollmann, 13026 Woodbridge St., Studio City, Calif.

Filed July 9, 1956, Ser. No. 596,800

6 Claims. (Cl. 179—100.3)

(Granted under Title 35, U.S. Code (1952), sec. 266)

The invention described herein may be manufactured and used by or for the Government of the United States of America for governmental purposes without the payment of any royalties thereon or therefor.

The present invention relates to a new and novel signal recording system and more particularly to a signal recording system wherein a light sensitive recording means is subjected to light of a constant intensity which is focussed on a narrow portion thereof; and such narrow portion is simultaneously subjected to an electrostatic field which varies in accordance with the signals to be recorded.

The present invention is particularly adapted for recording sound, as for example, in recording the sound track on motion picture film, but it is also useful for high-frequency recording such as the recording of television and telemetry signals. As is well-known, the sound track on a motion picture film is recorded in the form of a strip having striations of varying density in accordance with the sound recorded thereon. The best known of the prior art systems for producing the sound track on motion picture films utilizes a modulated light source wherein an electromechanical means is employed for modulating the light source. Such systems have proved to be satisfactory in operation and have been widely utilized, but however, due to the complex system required for modulating a light source, the frequency response of such systems is limited. This problem is well recognized in the art, and numerous attempts have been made to design systems for overcoming this inherent disadvantage found in any electromechanical type of modulating means.

Accordingly, recording systems have been designed which employ no moving parts in the modulating means thereof, as for example, shown in U.S. Patent No. 1,926,406. In the system as shown in the aforementioned patent, an electrostatic recording field is utilized for modulating a film, and a guard field is provided for the purpose of focussing the recording field. The recording system as shown in the patent has been specifically designed to obviate the need of a light source to affect the sensitized film, and accordingly the electromechanical means for modulating such a light source as used in the prior art has been eliminated. The foregoing patent system has certain inherent disadvantages which have prevented its being extensively utilized for the intended purpose. Such a system requires excessively high recording voltages, and in addition there is the added problem of focussing the recording electrostatic field which has been attempted by the use of an additional guard field for affecting the recording field. The use of a guard field for focussing the recording field in such a system has only a limited effect, and as a result, due to the natural tendency of the recording field to spread out along the longitudinal dimension of the film, the frequency response in such a recording system is no greater than that obtainable with a system employing a modulated light source.

In the present invention, a source of light of constant intensity is provided, the light therefrom impinging upon the light sensitive photographic film; and at the same time, the film is subjected to an electrostatic field which is varied in accordance with the recorded signals thereby varying the light sensitivity of the film which accordingly creates striations of varying density when the film is developed whereby the recorded signals may be produced as the original signals with a conventional reproducing system. Since no moving parts are utilized in that portion of the system which varies the density of the recording means, and further since the light may be sharply focussed on the recording means, an extremely high frequency response is obtainable with the invention system. The voltages employed for producing the electrostatic field in the present invention are maintained below the level which is required for producing a corona effect or for producing striations as in the aforementioned patent. Consequently, only low recording voltages are required for satisfactory results, and a high signal to noise ratio is obtainable with the present system in contrast to that obtainable with the prior art systems.

An object of the present invention is the provision of a new and novel signal recording system wherein a very high frequency response is obtainable.

Another object of the invention is to provide a signal recording system in which only low recording voltages are required.

A further object of the present invention is the provision of a signal recording system which provides an improved signal to noise ratio.

Yet another object of the invention is to provide a signal recording system which is simple and inexpensive in construction, yet which is very sensitive and reliable in operation.

Other objects and many of the attendant advantages of this invention will be readily appreciated as the same becomes better understood by reference to the following detailed description when considered in connection with the accompanying drawing which illustrates a schematic diagram of a signal recording system according to the present invention.

Referring now to the drawing, there is shown a signal recording means in the form of a conventional photographic film 10 which is adapted to be unwound from a storage reel 11 onto a take-up reel 12, the film being driven by means of rollers 13 and 14 which may be actuated in the direction of the arrows by any suitable means such as a synchronous motor or the like. Suitable spring means (not shown) are provided on take-up reel 12 to enable the film to be wound under tension on the take-up reel. The film passes over and is supported by the grounded electrode 15 formed of a suitable electrically conductive material such as metal. Although it is considered preferable to have the film in contact with recording electrode 15 in order to assist in tensioning the film, such an arrangement is not necessary, and electrode 15 may be spaced from the film if desired. A second recording electrode 16 formed of a suitably electrically conductive substance similar to electrode 15 is spaced from electrode 15 such that film 10 passes between the two recording electrodes and is consequently subjected to any electrostatic field existing therebetween.

Electrode 16 is provided with an enclosed chamber 17 therein, and a transparent end portion 18 is provided at one end of recording electrode 16, end portion 18 being preferably in the form of an optical lens, the purpose of which will be hereinafter more fully described. A source of light of constant intensity is provided within chamber 17 and may be in the form of a conventional electric light bulb 19 which is shown being provided with a source of electrical energy in the form of a battery 20. It is apparent that the light emanating from source 19 will pass through lens 18 provided at the lower end of electrode 16, and the lens is so designed that the light will be sharply focussed on the photographic film in a narrow strip which is normal to the longitudinal dimension of the film as indicated by dotted lines 21.

A simple modulating system is shown in the form of a microphone 25 which feeds into an amplifier 26, the output of which is impressed upon electrode 16 through lead 28 and to ground and upon electrode 15 through lead 29. Hence the film is subjected to an electrostatic field of fluctuating intensity. The signal voltages are superimposed upon a constant bias voltage which is taken directly from the plate or output circuit of the amplifier or from extra bias battery 30. Such a D.C. bias is necessary for determining the signal polarity and to produce the difference between positive and negative amplifier signals.

Instead of a D.C. bias, the film may be subjected to an A.C. bias produced by an oscillator whose amplitudes are modulated with the signals to be recorded. These carrier oscillations are preferably in the radio frequency range whereby certain frequencies characterized by abnormal dispersion have a strong effect upon the light sensitivity of the film. It is evident that other types of conventional and well-known modulating systems may be used for producing a modulated electrostatic field between recording electrodes 15 and 16 in a well-known manner.

During operation of the above-described system, rollers 13 and 14 are continuously driven whereby successive portions of the film 10 are caused to pass between the recording electrodes 15 and 16 such that those portions of the film passing between electrodes are simultaneously subjected to the focussed light rays passing through lens 18 from source 19 and the electrostatic field existing between the recording electrodes. It is important to note that the voltages utilized for producing the electrostatic field in the present invention are maintained below the level which is required for producing a corona effect or which in another manner may produce striations upon the photographic film. As a result, the only variations in density of film which are produced in the present invention are a result of the chemical action of the film due to the impingement of the light rays thereon. Since the light sensitivity of the chemicals employed in the photographic film is affected by the varying electrostatic field, the constant intensity of the rays from the light source is enabled to produce a modulation in the density of the film and in this manner to record the desired signals thereon.

It is evident that any conventional means may be utilized for moving the film between the electrodes and that the film driving system as disclosed is merely for the purpose of illustration. As pointed out previously, it is not essential that recording electrode 15 be in contact with the film, and additionally it should be noted that the configuration thereof is merely illustrative and that any desired configuration may be provided as long as an electrostatic field may be created between the recording electrodes. It is also obvious that the configuration of electrode 16 may be varied as desired as long as a means is provided at the lower end thereof adjacent the other recording electrode to sharply focus the light rays emanating from the light source 19.

Although the above described and disclosed system is considered to be a preferable arrangement in view of the simplicity and compactness thereof, it is evident that as a possible modification thereof the two electrodes 15 and 16 may be chosen of arbitrary configuration as long as they are spaced the proper distance from one another such that an electrostatic field may be created therebetween. The light source need not of necessity be confined within one of the recording electrodes, and consequently may be mounted separately from the electrodes in such a manner that the light emanating therefrom is sharply focussed upon that area of the film which is subjected to the electrostatic field between the recording electrodes and the remainder of the film is not subjected to the impingement of any light.

It is apparent from the foregoing that there is provided a new and novel signal recording system which provides a high frequency response and improved signal to noise ratio with low recording voltages. The system is extremely simple and inexpensive in construction, yet is highly sensitive and reliable in operation.

Obviously many modifications and variations of the present invention are possible in the light of the above teaching. It is therefore to be understood that within the scope of the appended claims the invention may be practiced otherwise than as specifically described.

I claim:
1. A signal recording system which comprises means for creating a recording electrostatic field of varying strength impinging upon a light sensitive recording means, a source of light of constant intensity, and means for focussing the light emanating from said source upon a narrow portion of that area of the recording means during the time that the latter is being subjected to said varying electrostatic field.

2. A system as defined in claim 1 including means for moving said recording means relative to said electrostatic field.

3. In a signal recording system, the combination of first and second spaced electrode structures, a light sensitive recording means having a portion thereof positioned adjacent said electrode structures, means for moving said recording means relative to said electrode structures, means for impressing a recording voltage upon said electrode structures thereby establishing a varying electrostatic field therebetween which impinges upon said recording means, a source of light of constant intensity, and means for focussing the light emanating from said source upon a portion of that area of the recording means during the time that the latter is being subjected to said varying electrostatic field.

4. A system as defined in claim 3 wherein one of said electrode structures comprises a closed hollow member having a transparent end portion adjacent a portion of said recording means, said source being disposed within said one electrode.

5. A system as defined in claim 4 wherein said means for focussing the light emanating from said source comprises an optical lens constituting the transparent end portion of said closed hollow member.

6. A signal-recording system comprising a medium on which said signal is to be recorded, said medium being sensitive both to light and to the effects of an electrostatic field, a source of light of constant intensity, means for establishing an electrostatic field the strength of which varies in accordance with said signal, and means for sequentially exposing different portions of said medium concurrently to the unvarying light from said source and to said varying electrostatic field.

References Cited in the file of this patent

UNITED STATES PATENTS

| | | |
|---|---|---|
| 1,897,247 | Eldred | Feb. 14, 1933 |
| 2,277,013 | Carlson | Mar. 17, 1942 |
| 2,440,565 | Antalek | Apr. 27, 1948 |
| 2,583,546 | Carlson | Jan. 29, 1952 |
| 2,584,695 | Good | Feb. 5, 1952 |
| 2,624,652 | Carlson | Jan. 6, 1953 |
| 2,676,100 | Huebner | Apr. 20, 1954 |
| 2,726,289 | Evans | Dec. 6, 1955 |